United States Patent [19]  [11] 3,875,082
Finck  [45] Apr. 1, 1975

[54] ALKALI METAL ALKYL SULPHONATE ANTISTATIC AGENT

[75] Inventor: Hans-Werner Finck, Oberwil/Basel-Land, Switzerland

[73] Assignee: Sandoz Ltd., Basel, Switzerland

[22] Filed: Aug. 16, 1973

[21] Appl. No.: 389,014

[30] Foreign Application Priority Data
Aug. 22, 1972 Switzerland................. 12404/72

[52] U.S. Cl................. 252/518, 252/309, 252/383, 252/554
[51] Int. Cl............................................. C09k 3/16
[58] Field of Search......... 252/518, 383, 554, 313 S, 252/309, 384, 385, 535

[56] References Cited
UNITED STATES PATENTS

| | | | |
|---|---|---|---|
| 2,526,684 | 10/1950 | Powers | 252/313 S |
| 2,746,980 | 5/1956 | Bray | 252/554 X |
| 3,247,148 | 4/1966 | Ellis et al. | 252/518 |
| 3,377,293 | 4/1968 | Shepard | 252/313 S |
| 3,424,690 | 1/1969 | Marquis | 252/383 X |
| 3,686,099 | 8/1972 | Gerchenova et al. | 252/554 |

Primary Examiner—Benjamin R. Padgett
Assistant Examiner—R. E. Schafer
Attorney, Agent, or Firm—Gerald D. Sharkin; Richard E. Vila; Thomas C. Doyle

[57] ABSTRACT

The present invention concerns novel antistatic formulations for polymeric materials which contain alkali metal alkyl sulphonates as antistatic agents. The formulations are resistant to caking under the effect of humidity.

7 Claims, No Drawings

ALKALI METAL ALKYL SULPHONATE ANTISTATIC AGENT

IMPROVEMENTS IN OR RELATING TO ORGANIC COMPOUNDS

The present invention relates to antistatic agents for polymeric materials and specifically to alkali metal alkyl sulphonate antistatic agents.

Alkali metal alkyl sulphonates, e.g. the compounds of formula I, $$R - SO_3Me \qquad I$$

wherein
Me is sodium or potassium
and
R is alkyl of 6 to 22 carbon atoms,
are known and their use as antistatic agents for polymeric materials is also known. In the use of the alkali metal alkyl sulphonates as antistatic agents for polymeric materials, it is most desirable to distribute the sulphonate throughout the polymeric material as evenly as possible in order to obtain adequate antistatic action. To this end, it is advantageous to employ the alkali metal alkyl sulphonate as a finely divided powder. However, the alkali metal alkyl sulphonates are hygroscopic compounds with the result that they tend to cake on exposure to the atmosphere, particularly finely divided powder forms.

The present invention is directed to the problem of preserving alkali metal alkyl sulphonates against the caking effect of humidity e.g. in the atmosphere.

Accordingly, the present invention provides an alkali metal alkyl sulphonate antistatic formulation for polymeric materials, the formulation comprising an alkali metal alkyl sulphonate antistatic agent in association with finely divided silicon dioxide in anhydrous or hydrate form thereof.

The antistatic formulation in accordance with the invention is found to possess improved resistance to the caking effects of humidity, especially in finely divided form.

Preferably, the formulation contains between 0.1 to 50 %, more preferably between 1 and 30 %, especially between 2 and 20 %, e.g. between 5 and 15 %, by weight of the silicon dioxide in relation to the alkali metal alkyl sulphonate.

Preferably, the alkali metal alkyl sulphonate is a compound of formula I, especially a compound of formula Ia, $$R'—SO_3Me \qquad Ia$$

wherein
R' is alkyl of 12 to 18 carbon atoms
and
Me is as defined above.

The alkyl function of the alkali metal alkyl sulphonate may be linear or branched, primary, secondary or tertiary. Examples of alkyl functions of the alkali metal alkyl sulphonates of the formulation are the monovalent radicals of n-hexane, n-heptane, n-octane, n-nonane, n-decane, n-dodecane, n-tetradecane, n-hexadecane, n-heptadecane, n-octadecane, n-docosane, or the monovalent radicals of the corresponding branched, naturally occuring alkanes.

In practice, usually mixtures of alkali metal alkyl sulphonates are used having alkyl functions, for example, with 14, 16 and 18 carbon atoms. The compounds are produced by conventional methods, where for the introduction of the sulphonic acid groups sulphur trioxide, sulphur dioxide and an oxidizing agent, or sulphur dioxide and chlorine may be used. In the latter case the sulphonic acid chlorides, formed as intermediate products, are then converted by hydrolysis into the sulphonic acids. Afterwards the sulphonic acids are converted by conventional manner into the alkali salts, preferably into the sodium salts, [Ullmann, Handbuch der Techn.Chemie, volume 16, page 562 $f$ and volume 18, page 325 $f$ /1967/ :

The formulation may contain finely divided silicon dioxide in any anhydrous or hydrate form thereof. For example, commercially available forms produced synthetically, e.g. by reprecipitation or flame hydrolysis, such as silicic acid, Aerosil (tradename), Cabosil (tradename), or natural products such as diatomaceous earth may be employed. It is found that, generally, decrease in the particle size of the silicon dioxide, improves the function of the silicon dioxide in the formulation.

The antistatic formulation may be employed for antistatic use in much the same way as the alkali metal alkyl sulphonate constituent thereof.

Thus, polymeric materials for which the antistatic formulation is suitable are polyvinyl chloride, polystyrene, polyester, especially polyethylene terephthalate, polyamide, especially nylon 6 and copolymers of styrene/butadiene, preferably polyvinyl chloride.

The formulation is distributed throughout the polymeric material by mixing in manner known per se.

The amount of antistatic formulation employed in providing a polymeric material with antistatic protection will naturally vary depending on e.g. the nature of the polymeric material. In general, however, the formulation is employed in relation to the amount of alkali metal alkyl sulphonate present in the formulation, to provide between 0.1 and 5 %, preferably between 0.5 and 1.5 %, by weight of the alkali metal alkyl sulphonate in the polymeric material.

One example of a formulation of the invention will now be described. Where parts and percentages are referred to, these are by weight.

EXAMPLE a. 900 parts of flaky commercially available Na-alkyl sulphonate, containing approximately 95 % of a mixture of sodium alkyl sulphonates having mainly straight chain alkyl functions of 14, 16 and 18 carbon atoms and 100 parts of finely divided silicic acid are premixed for 10 minutes in a cylindrical bottle. The mixture is then intimately mixed for 10 minutes in a Papenmeyer mixer (approximately 2,000 r.p.m.) or finely ground on a Kolloplex mill (Alpine) at 3,000 r.p.m. A fine powder is obtained which is found to remain free flowing on standing for more than 4 weeks in the open air.

b. 100 parts of hard PVC with 1,5 parts of a tin stabilizer and 1 part of the above mixture are worked on a roller mill set at 160–170°C. Plates of 1 mm thickness are pressed from the rolling sheet at 190°–200°C.

What is claimed is:

1. An antistatic agent for polymeric material having resistance to caking which comprises an alkali metal alkyl sulphonate of the formula $$R - SO_3Me$$

wherein
Me is sodium or potassium, and
R is alkyl of 6 to 22 carbon atoms,
in the form of a finely divided powder and 1 to 30%, by weight of said sulphonate, of finely divided silicon dioxide in anhydrous or hydrate form.

2. The antistatic formulation of claim 1, wherein the silicon dioxide is in hydrate form.

3. The antistatic formulation of claim 2, wherein the hydrate form of silicon dioxide is silicic acid.

4. The antistatic formulation of claim 1, wherein the alkali metal alkyl sulphonate is of the formula:

$$R' - SO_3Me$$

wherein
Me is defined in claim 1 and
R' is alkyl of 12 to 18 carbon atoms.

5. The antistatic formulation of claim 1, containing between 2 and 20 % by weight of the silicon dioxide in relation to the alkali metal alkyl sulphonate.

6. A composition according to claim 1, wherein the amount of silicon dioxide is 5 to 15% by weight of the sulphonate.

7. A composition according to claim 1, wherein the silicon dioxide is produced by reprecipitation or by flame hydrolysis.

* * * * *